United States Patent [19]

Itakura

[11] Patent Number: 5,630,574
[45] Date of Patent: May 20, 1997

[54] TORQUE SHOCK ABSORBER DEVICE

[75] Inventor: Ryoichi Itakura, Mitaka, Japan

[73] Assignee: Jamco Corporation, Tokyo, Japan

[21] Appl. No.: 596,666

[22] Filed: Feb. 5, 1996

[30] Foreign Application Priority Data

Feb. 8, 1995 [JP] Japan .................. 7-000440 U

[51] Int. Cl.$^6$ ............................................. F16F 1/06
[52] U.S. Cl. .................................................. 267/155
[58] Field of Search ..................... 188/290, 381; 267/154, 155; 74/513, 574, 470; 16/82, 85

[56] References Cited

U.S. PATENT DOCUMENTS

| | | | |
|---|---|---|---|
| 3,083,400 | 4/1963 | Anderson | 267/155 |
| 4,893,522 | 1/1990 | Arakawa | 188/290 |
| 5,133,433 | 7/1992 | Oosawa | 188/290 |
| 5,211,269 | 5/1993 | Oshima | 188/290 |

Primary Examiner—Robert J. Oberleitner
Assistant Examiner—Chris Schwartz
Attorney, Agent, or Firm—Fildes & Outland, P.C.

[57] ABSTRACT

Interference between a spring and a shaft is prevented in a torque shock absorber device which uses a coil spring. The torque shock absorber device has a shaft which is fixed on a base plate, and a sleeve is installed which is free to rotate against the shaft. On the sleeve, a torque transmission part is installed. One end of the coil spring is inserted and fixed in a slot of the shaft. The coil spring is wound on a peripheral part of the shaft and sleeve, and the other end is fixed on the torque transmission part. When torque is applied on the torque transmission part, the sleeve is rotated with the wound coil spring and no friction is generated between the sleeve and shaft.

4 Claims, 1 Drawing Sheet

TORQUE SHOCK ABSORBER DEVICE

FIELD OF THE INVENTION

This invention relates to a torque shock absorber device and more particularly to an improvement in maintenance of durability of a torque spring to be installed on various airplane parts, automobile parts, home appliances, plant parts, medical parts, and sports parts which require reliability and durability.

BACKGROUND OF THE INVENTION

A conventional torque spring is made of steel wire which is wound in a spiral form. A shaft is installed inside the spring and anchors are installed on both ends thereof. One side anchor is rotatable on an axis which is the center of the spiral steel wire. As the spiral steel wire is twisted, the steel wire reacts against the applied external force to return the spring to its previous shape before twisting.

Here, the effective diameter of the spiral steel becomes smaller by the torsion action, and the surface of the inside shaft and the steel wire come closer to each other. Depending on the effective diameter of the spiral steel and the inside shaft diameter, these two pieces make contact. When contact is made, the contact section without any movement generates friction motion. If the shaft diameter is very small so that there is no contact, snaking motion is generated by the spiral steel wire more easily, and thus spring action cannot be obtained on the total winding of the spiral steel wire. Contact by the snaking is also generated by a degree of snaking motion. Effects of the contact and snaking cause some problems of planned durability maintenance.

The torque shock absorber device of the present invention solves the problems described above, reduces contact wear and snaking, and maintains the durability of the spring.

SUMMARY OF THE INVENTION

A torque shock absorber device of this invention comprises a shaft, a cylindrically shaped sleeve which is rotatably installed on the shaft, a torque transmission part installed on the sleeve, and a coil spring of which one end is fixed on the shaft and a spring is wound about the circumference of the shaft and sleeve and the other end is fixed on the torque transmission part.

When torsion force is applied on the torque transmission part and the coil spring is tightened, the coil spring rotates with the sleeve and does not interfere with the shaft. Therefore, there is no wear associated with contact between the spring and shaft.

These and other features and advantages of the invention will be more fully understood from the following detailed description of the invention taken together with the accompanying drawings.

DETAILED DESCRIPTION OF THE INVENTION

Figure 1:
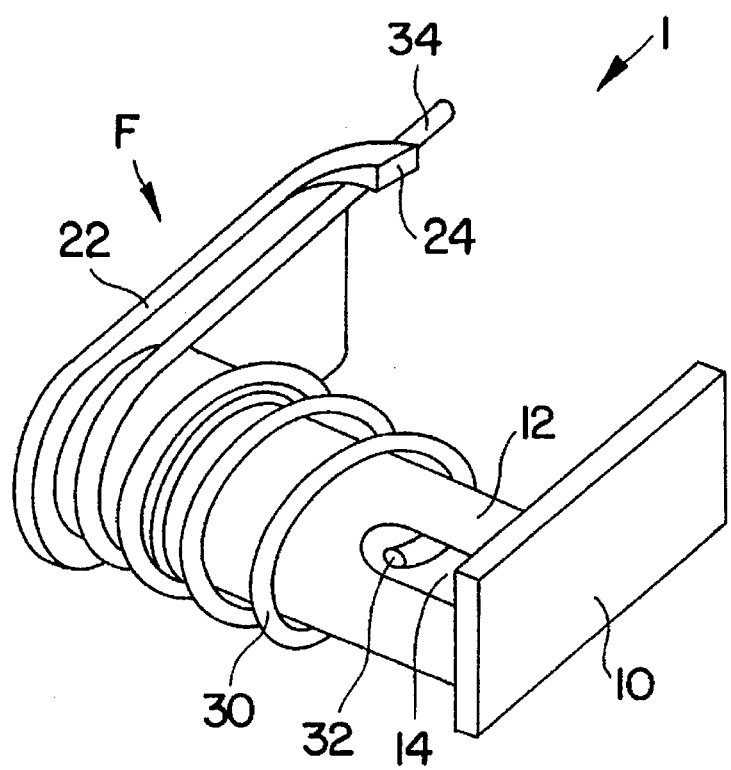
FIG. 1 is a perspective view of a torque shock absorber device constructed in accordance with the present invention.
Figure 2:
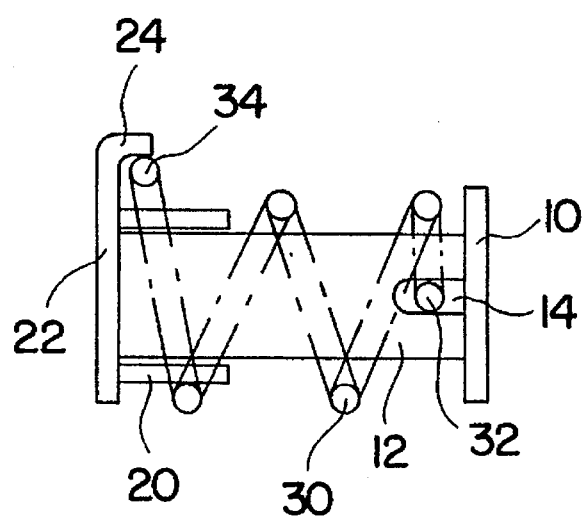
FIG. 2 is a side view of the torque shock absorber device of FIG. 1.

Referring now to the drawings in detail, numeral 1 generally indicates a torque shock absorber device. The torque shock absorber device 1 includes a base plate 10 and a shaft 12 which is fixed on the base plate 10. A torque transmission part 22 having a sleeve 20 mates with the shaft 12 on the opposite end from the base plate 10. The torque transmission part 22 is installed rotatably on the shaft 12.

A slot 14 is formed near the base plate 10 of the shaft 12. One end 32 of a coil spring 30 is terminated in slot 14. The coil spring 30 is wound about the outer circumference of the shaft 12 and the outer circumference of the sleeve 20. The other end 34 of the spring 30 is terminated at a claw section 24 formed on the tip of the arm of the torque transmission part 22.

When the device is used, the base plate 10 is fixed on the frame of some equipment, and the torque transmission part 22 is connected to a source of torque generation. When an external force F is applied on the torque transmission part 22, the torque transmission part 22 rotates against the shaft 12 by receiving the force. When the torque transmission part 22 is rotated, the coil spring 30 is wound and spring force is generated. Torque applied on the torque transmission part 22 is partially absorbed by the spring force.

Since the torque transmission part 22 is supported against the shaft 12 through the sleeve 20, part 22 can be rotated smoothly. When the spring 30 is wound, its diameter is reduced, but there is no effect on the shaft 12 since the spring is supported by the sleeve 20.

As described above, equipment which absorbs torque has a structure such that one end of the coil spring 30 for the damping is fixed to the shaft 12 of a fixed position side, and a sleeve 20 is installed on the torque transmission part 22. The coil spring 30 is wound on the sleeve 20 and the other end of the coil spring engages the torque transmission part 22.

By this structure, the torque transmission part 22 can be rotated smoothly. This structure also eliminates contact between the coil spring 30 and shaft 12 to prevent the generation of wear of the parts. In addition, abnormal noise which is generated when these parts make contact, can be prevented.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A torque shock absorber device comprising a shaft, a cylindrically shaped sleeve which is rotatably mounted on the shaft, a torque transmission part fixed to the sleeve, and a coil spring wound about the circumference of the shaft and sleeve, said spring being supported by the sleeve and having one end fixed directly to the shaft and another end engaging the torque transmission part.

2. The torque shock absorber device described in claim 1 wherein said torque transmission part includes an arm shaped part.

3. The torque shock absorber device described in claim 1 wherein said coil spring is wound about the circumference of the shaft without making contact therewith.

4. The torque shock absorber device described in claim 1 wherein said sleeve is shorter in length than said shaft.

* * * * *